United States Patent [19]

Romenesko et al.

[11] 4,381,241

[45] Apr. 26, 1983

[54] INVERT EMULSIONS FOR WELL-DRILLING COMPRISING A POLYDIORGANOSILOXANE AND METHOD THEREFOR

[75] Inventors: David J. Romenesko; Harry M. Schiefer, both of Midland, Mich.

[73] Assignee: Dow Corning Corporation, Midland, Mich.

[21] Appl. No.: 236,968

[22] Filed: Feb. 23, 1981

[51] Int. Cl.$^3$ .................. C09K 7/06; E21B 43/00
[52] U.S. Cl. .................. 252/8.5 P; 252/8.55 R
[58] Field of Search .......... 252/8.5 P, 8.5 M, 8.55 R, 252/309, 351

[56] References Cited

U.S. PATENT DOCUMENTS

| | | | |
|---|---|---|---|
| 2,689,219 | 9/1954 | Menaul | 252/8.5 |
| 2,793,996 | 5/1957 | Lummus | 252/8.5 |
| 2,805,722 | 9/1957 | Morgan et al. | 252/8.55 X |
| 2,846,458 | 8/1958 | Haluska | 252/351 X |
| 2,876,197 | 3/1959 | Watkins | 252/8.5 |
| 2,885,358 | 5/1959 | Reddie | 252/8.5 |
| 3,234,252 | 2/1966 | Pater | 260/448.2 |
| 3,542,044 | 11/1970 | Hansen | 137/13 |
| 3,677,962 | 7/1972 | Koerner et al. | 252/345 |
| 3,709,819 | 1/1973 | Browning et al. | 252/8.5 |
| 3,799,874 | 3/1974 | Parker | 252/8.55 |
| 4,122,029 | 10/1978 | Gee et al. | 252/309 |

FOREIGN PATENT DOCUMENTS 1,360,398 7/1974 United Kingdom .

*Primary Examiner*—Herbert B. Guynn
*Attorney, Agent, or Firm*—George A. Grindahl

[57] ABSTRACT

The preparation of emulsions of light and heavy brines in a liquid hydrocarbon is described, using a polydiorganosiloxane bearing at least one polyoxyalkylene radical and at least one monovalent hydrocarbon radical having from 6 to 18 carbon atoms. The emulsions are useful in the well-drilling art as drilling fluids, completion fluids, packer fluids, spacer fluids and workover fluids because of their thermal stability and because they can be formulated to have a relatively high density, with or without added weighting agents.

20 Claims, No Drawings

INVERT EMULSIONS FOR WELL-DRILLING COMPRISING A POLYDIORGANOSILOXANE AND METHOD THEREFOR

BACKGROUND OF THE INVENTION

The present invention relates to invert emulsions for the well-drilling industry and to a method for their preparation. More particularly, the present invention relates to compositions comprising an emulsion of a brine in a liquid hydrocarbon which are useful in well-drilling operations, such as in gas- and/or oil-well drilling, as a drilling fluid, a completion fluid, a workover fluid, a casing pack fluid, a fracturing fluid, a packer fluid and a spacer fluid.

Invert emulsions, in the form of drilling muds, completion fluids and packer fluids are well known in the well-drilling art. Invert emulsions typically consist of a fluid phase comprising from 15 to 45 percent by volume of a $CaCl_2$ brine, and 55 to 85 percent by volume of diesel oil and a solid phase comprising agents for pressure control, filtration control, viscosity control, gelling, etc. An invert emulsion drilling mud generally contains from 5 to 30 percent by volume of the brine.

While conventional invert emulsions are used in drilling deep wells, where high temperature and pressure are commonly encountered, they are not completely satisfactory for such a use. For example, invert emulsions are sometimes not sufficiently stable at the high temperatures encountered in deep wells. Furthermore, the use of excessive amounts of a weighting agent in an invert emulsion to achieve pressure control in deep wells is often undesirable because performance and properties of the emulsion can be adversly affected. Heavier brines, such as $CaBr_2$ brines and/or $ZnBr_2$ brines, have been used to increase the density of an invert emulsion, thereby achieving greater pressure control; however, sometimes the thermal stability of these heavier emulsions is marginal or non-existent. Further improvements in pressure control and in temperature stability of the invert emulsion are needed.

BRIEF SUMMARY OF THE INVENTION

It is an object of this invention to provide a solids-free invert emulsion which is suitable for use in the well-drilling industry. It is another object of this invention to provide invert emulsions of a high density brine which have stability at high temperature. It is a further object of this invention to provide improved invert emulsion muds. It is another object of this invention to provide solids-free invert emulsions having high density and being suitable for use in a deep-well drilling. It is also an object of this invention to provide a method for preparing the invert emulsions of this invention. It is yet another object of this invention to provide a polydiorganosiloxane/liquid hydrocarbon concentrate which is useful for preparing improved invert emulsions.

These objects, and others, which will become obvious when considering the following disclosure and appended claims, are obtained by the present invention which comprises emulsifying a brine in a liquid hydrocarbon containing certain polydiorganosiloxane surface active agents. According to this invention it is possible not only to prepare a thermally stable emulsion of a high density brine but also to prepare a stable emulsion comprising a fluid phase having a major amount of a high density brine and a minor amount of a liquid hydrocarbon. The resulting invert emulsions are sufficiently dense to permit their use as a solids-free completion fluid in deep well drilling; they can also be formulated to contain solid and/or liquid components which are commonly used in the well-drilling art for various purposes, such as for preparing invert emulsion drilling muds.

DETAILED DESCRIPTION OF THE INVENTION

The present invention relates to an emulsion composition to be used in well-drilling and comprising (A) from 1 to 75 parts by volume of a brine as a discontinuous phase, (B) from 25 to 99 parts by volume of a liquid hydrocarbon selected from the group consisting of kerosene, diesel oil, crude oil, turbine fuel, mineral oil, gas oil and paraffins having a flash point of at least 100° F. as a continuous phase, and (C) from 0.05 to 15 parts by weight, for every 100 parts by weight of brine plus liquid hydrocarbon, of a polydiorganosiloxane having the formula $$Z_3SiO\{(CH_3)_2SiO\}_x\{(CH_3)(R)SiO\}_y\{(CH_3)(Q)SiO\}_zSiZ_3,$$

wherein Q denotes a polyoxyalkylene radical having the formula $-R'(OCH_2CH_2)_p(OCH_2CHCH_3)_qOR''$, R denotes a monovalent hydrocarbon radical having from 6 to 18 carbon atoms, inclusive, R' denotes a divalent radical bonded to a silicon atom by a silicon-carbon bond, R" denotes a monovalent radical selected from the group consisting of hydrogen, alkyl, cycloaliphatic, aryl, arylalkyl and acyl radicals, Z denotes a monovalent hydrocarbon radical having from 1 to 5 carbon atoms, inclusive, or an R radical or a Q radical, x has an average value of from 0 to 400, y has an average value of from 0 to 400, z has an average value of from 0 to 5, $x+y+z$ has an average value of from 30 to 400, p has an average value equal to or greater than the average value of q and $p+q$ has an average value sufficient to provide a formula weight of from 600 to 3500 for the $-(OCH_2CH_2)_p(OCH_2CHCH_3)_q-$ portion of the Q radical, there being an average of at least one Q radical and an average of at least one R radical per molecule of the polydiorganosiloxane.

The present invention further relates to a method for preparing the emulsion compositions of this invention comprising (I) mixing, to form a solution, (i) 0.5 to 15 parts by weight of a polydiorganosiloxane having the formula $Z_3SiO\{(CH_3)_2SiO\}_x\{(CH_3)(R)SiO\}_y\{(CH_3)(Q)SiO\}_zSiZ_3$ wherein Q denotes a polyoxyalkylene radical having the formula $-R'(OCH_2CH_2)_p(OCH_2CHCH_3)_qOR''$, R denotes a monovalent hydrocarbon radical having an average of from 6 to 18 carbon atoms, inclusive, R' denotes a divalent radical bonded to a silicon atom by a silicon-carbon bond, R" denotes a monovalent radical selected from the group consisting of hydrogen, alkyl, cycloaliphatic, aryl, arylalkyl and acyl radicals, Z denotes a monovalent hydrocarbon radical having from 1 to 5 carbon atoms, inclusive, or an R radical or a Q radical, x has an average value of from 0 to 400, y has an average value of from 0 to 400, z has an average value of from 0 to 5, $x+y+z$ has an average value of from 30 to 400, p has an average value equal to or greater than the average value of q and $p+q$ has an average value sufficient to provide a formula weight of from 600 to 3500 for the $-(OCH_2CH_2)_p(OCH_2CHCH_3)_q-$ portion of the Q radical, there being an average of at least one Q radical and an average of at least one R radical per molecule of the polydiorganosiloxane, and (ii) aV parts by volume of a liquid hydrocarbon selected from the group consisting of kerosene, diesel oil, crude oil, turbine fuel, mineral oil, gas oil and paraffins having a flash point of at least 100° F., (II) mixing the solution of step (I) with bV parts by volume of the liquid hydrocarbon, (III) mixing V' part by volume of a brine with the solution of step (II) with sufficient shear energy to provide an emulsion having a brine particle size of less than 10 micrometers in diameter, and (IV) mixing the emulsion of step (III) with cV parts by volume of the liquid hydrocarbon, wherein V has an average of from 25 to 99 parts by volume, a has a value of from greater than zero to 1, b has a value of from zero to less than 1, c has a value of from zero to less than 1, a plus b plus c has a value of 1, V' has a value of from 1 to 75 parts by volume and the weight of V plus V' has a value of 100 parts by weight.

The present invention further relates to a polydiorganosiloxane/liquid hydrocarbon concentrate comprising from 0.5 to 15 parts by weight of the polydiorganosiloxane component and a portion of the liquid hydrocarbon equal to from 0.0001 to 0.1 of the total amount of liquid hydrocarbon component that is used to prepare the emulsion compositions of this invention.

The discontinuous phase of the emulsion compositions of this invention is a brine. Herein, the term brine is used in its broadest sense, i.e. an aqueous solution of a salt containing at least 3 percent by weight of the salt. Preferably the brine is a saturated aqueous solution of the salt at 20° C. The term brine further includes brine occuring naturally or brine prepared synthetically. It is within the scope and spirit of this invention to dissolve one or more salts in natural brine to prepare a brine suitable for use in the compositions of this invention.

The salt portion of the brine preferably has a high solubility in water at room temperature so that the emulsion compositions of this invention can be formulated to have a wide range of densities. The salt advantageously has, in addition to a high solubility in water, a large formula weight so that the brine can be formulated to have a high density, for example up to 22 pounds per gallon (2642 kilograms per cubic meter).

Salts typically used in the well-drilling art, and being suitable for use in the compositions of this invention, include sodium chloride, sodium carbonate, potassium chloride, potassium carbonate, calcium chloride, calcium bromide, zinc chloride, zinc bromide and mixtures thereof.

Conveniently, a suitable brine for the compositions of this invention can be the natural brine that is frequently present at the drilling site where these compositions are used. In this case the present invention contemplates the storing of the other components of these compositions, hereinafter delineated, at the drilling site as separate and/or mixed components and formulating the emulsions of this invention in-the-field, as desired. Said natural brine can be further mixed with a salt, if desired.

A preferred brine in the emulsion compositions of this invention comprises water saturated with a mixture of calcium bromide and zinc bromide and having a density of about 20 pounds per gallon at 20° C. Such a brine can be emulsified in a liquid hydrocarbon according to this invention to provide an emulsion that needs no additional weighting agent, such as barium sulfate, to permit its use as a completion fluid in petroleum- and/or gas-well drillings. Said emulsion can also be readily formulated with well-known additives to provide improved drilling muds for deep petroleum- and/or gas-well drillings.

The continuous phase of the emulsion compositions of this invention is a liquid hydrocarbon selected from the group consisting of paraffins having a flash point of at least 100° F., kerosene, turbine fuel, crude oil, diesel oil, gas oil, mineral oil and mixtures thereof.

Conveniently and economically, the liquid hydrocarbon can be the crude oil that is being recovered from, and/or the hydrocarbon fuel such as diesel fuel, that is being used at, the drilling site where the compositions of this invention are used. When additional factors beyond convenience and economics, such as safety, handling and environmental factors, are considered, mineral oil can be advantageously used as the liquid hydrocarbon in the compositions of this invention because of its relatively low volatility and relatively low odor. In any case the polydiorganosiloxane, delineated below, can be conveniently stored at the drilling field as a neat component, or as a concentrate in a liquid hydrocarbon if desired, and the compositions of this invention prepared therefrom in-the-field as desired.

The polydiorganosiloxane component of the compositions of this invention has the formula

$$Z_3SiO\{(CH_3)_2SiO\}_x\{(CH_3)(R)SiO\}_y\{(CH_3)(Q)SiO\}_zSiZ_3. \quad (I)$$

In formula (I) each R denotes, independently, a silicon-bonded monovalent hydrocarbon radical having from 6 to 18 carbon atoms, both inclusive, such as straight-chained or branched-chain alkyl radicals, such as hexyl, heptyl, octyl, nonyl, decyl, undecyl, dodecyl, tetradecyl, hexadecyl and octadecyl; cycloaliphatic radicals, such as cyclohexyl; aryl radicals, such as phenyl, tolyl, xenyl and naphthyl; and arylalkyl radicals, such as benzyl, 2-phenylethyl and 2-phenylpropyl. Preferably, R denotes an alkyl radical having from 6 to 18 carbon atoms, such as the octyl, decyl or dodecyl radical, to provide easy solubility of the polydiorganosiloxane in the liquid hydrocarbon of the compositions of this invention. Formula (I) can contain all the same R radicals or mixtures of two or more R radicals, as desired.

In formula (I) each Q denotes, independently, a silicon-bonded polyoxyalkylene radical having the formula

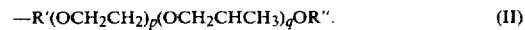

$$—R'(OCH_2CH_2)_p(OCH_2CHCH_3)_qOR''. \quad (II)$$

In the formula (II), R' denotes a divalent radical which bonds the polyoxyalkylene radical to a silicon atom by way of a silicon-carbon bond to provide hydrolytic stability therefor. The composition of the R' radical is not critical as long as it does not undergo hydrolytic cleavage in the compositions of this invention. Typically, R' is an alkylene radical, such as —CH$_2$CH$_2$—, —CH$_2$CH$_2$CH$_2$— or —CH$_2$CH$_2$CH(CH$_3$)—.

In formula (II) R" denotes a monovalent radical selected from the group consisting of the hydrogen atom; an alkyl radical, such as methyl, ethyl, propyl and butyl; an aryl radical, such as phenyl or tolyl; an arylalkyl radical, such as benzyl; or an acyl radical, such as acetyl. The composition of the R" radical is not critical; however, it is preferably a small radical such as the methyl radical or the acetyl radical and, most preferably, the hydrogen atom.

In formula (II), p and q denote numbers whose sum is sufficient to provide an average formula weight of from 600 to 3500 for the —$(OCH_2CH_2)_p(OCH_2CHCH_3)_q$— portion of the Q radical and the value of p is equal to or greater than the value of q. That is to say, the ratio of the number of oxypropylene units to the number of oxyethylene units in the Q radical has a value equal to or less than 1, such as 0, 0.1, 0.2, 0.5 and 1.0. In a preferred embodiment of this invention the sum of p+q has a value of about 50.

In formula (I) Z denotes a monovalent hydrocarbon radical having from 1 to 5 carbon atoms, inclusive, or a Q radical, or an R radical, as hereinabove delineated. The composition of the Z radical is not critical except when the values of y and/or z in the formula (I) are/is zero, in which case a sufficient number of Z radicals must be said R radical and/or Q radical, so that the polydiorganosiloxane contains, per molecule, an average of at least one R radical and an average of at least one Q radical. Typical radicals contemplated as Z radicals, in addition to said R and Q radicals delineated above, include methyl, ethyl, propyl, isopropyl and vinyl. Preferably all Z radicals are methyl radicals.

In formula (I) x denotes a number having an average value of from 0 to 400, preferably from 0 to 100; y denotes a number having an average value of from 0 to 400, preferably from 1 to 100; and z denotes a number having an average value of from 0 to 5, preferably from 1 to 5; within the further requirement that the sum of x+y+z has a value of from 30 to 400, preferably from 30 to 200.

The polydiorganosiloxane can also contain small amounts of unreacted precursor silicon-bonded radicals, such as hydrogen radicals, or chloroalkyl radicals which were present in the precursor materials that was used to prepare the polydiorganosiloxane, and trace amounts of incidental silicon-bonded radicals, such as hydroxyl radicals or alkoxy radicals which were incidentally introduced into the molecule during preparation of the polydiorganosiloxane. Preferably there are no precursor radicals and incidental radicals in the polydiorganosiloxane.

A first preferred polydiorganosiloxane in the compositions of this invention has the formula

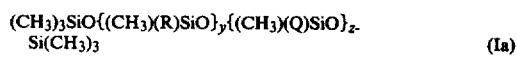

$(CH_3)_3SiO\{(CH_3)(R)SiO\}_y\{(CH_3)(Q)SiO\}_z\text{-}Si(CH_3)_3$ (Ia)

wherein the average values of y and z are greater than zero and their sum has a value of from 30 to 70. A highly preferred polydiorganosiloxane having the formula (Ia) is obtained when R denotes an alkyl radical and Q denotes a polyoxyalkylene radical having the formula

—$CH_2CH_2CH_2(OCH_2CH_2)_p(OCH_2CHCH_3)_qOH$ (IIa)

wherein the sum of p+q has a value of about 50; i.e. p has an average value of from about 25 to 50 and q has an average value of from about 0 to 25.

A second preferred polydiorganosiloxane in the compositions of this invention has the formula

$(CH_3)_3SiO\{(CH_3)_2SiO\}_x\{(CH_3)(R)SiO\}_y\{(CH_3)(Q)SiO\}_zSi(CH_3)_3$ (Ib)

wherein x has an average value of about 100, y has an average value of from about 30 to 70 and z has an average value of from 1 to 5. A highly preferred polydiorganosiloxane having the formula (Ib) is obtained when R and Q are as noted above for the first highly preferred polydiorganosiloxane component.

The polydiorganosiloxane component may be prepared by any suitable method; several are disclosed in the organosilicon art. A preferred method for preparing the polydiorganosiloxane component comprises reacting a methyl siloxane having terminal and/or in-the-chain silicon-bonded hydrogen radicals with an olefin having from 6 to 18 carbon atoms, such as 1-dodecene and an olefinically terminated polyoxyalkylene, such as $CH_2=CHCH_2(OCH_2CH_2)_p(OCH_2CHCH_3)_qOH$ in the presence of a platinum-containing catalyst, such as $H_2PtCl_6.6H_2O$. In this preferred method the olefin and the olefinically terminated polyoxyalkylene are most preferably reacted sequentially with the methylsiloxane containing silicon-bonded hydrogen radicals. The disclosures of U.S. Pat. Nos. 3,657,305; 3,234,252; 4,047,958; 3,427,271 and 2,846,458 are hereby incorporated herein by reference to further show methods for preparing the polydiorganosiloxane component of the compositions of this invention.

Many polydiorganosiloxanes suitable for use in the compositions of this invention are viscous liquids or waxy solids and are conveniently prepared and used as a solution in a suitable solvent such as the liquid hydrocarbon component hereinabove delineated.

The emulsion compositions of this invention can comprise from 1 to 75, preferably 10 to 60, parts by volume of the brine component and from 25 to 99, preferably 40 to 90, parts by volume of the liquid hydrocarbon component, the most preferred amounts depending upon the particular brine that is used, the particular liquid hydrocarbon that is used and the particular use of the emulsion composition in the well-drilling art. For example, when a solids-free completion fluid emulsion of this invention is to be used to prevent blow-out, i.e. the uncontrolled release of well-pressure, it is preferred that the emulsion composition comprise a maximum volume of a brine having a maximum density without destabilizing the emulsion to breaking (phase separation) or to inversion (phase reversal). A highly preferred emulsion composition of this invention for preventing blow-out thus comprises from 40 to 60 parts by volume of a saturated aqueous solution of $CaBr_2$ and $ZnBr_2$ having a density of about 20 pounds per gallon.

The amount of polydiorganosiloxane to be used in the emulsion compositions of this invention is based on the total weight of the brine and liquid hydrocarbon and can range from 0.5 to 15, preferably 2 to 6 parts by weight for every 100 parts by weight of brine plus liquid hydrocarbon. The proper amount of polydiorganosiloxane to be used in any particular emulsion will depend upon the particular brine and liquid hydrocarbon that is used and their relative volumes and can be determined by simple experimentation, in view of the examples hereinafter disclosed.

The emulsion compositions of this invention can be prepared by conventional emulsifying methods. Preferably the polydiorganosiloxane is dissolved in all, or a portion, of the liquid hydrocarbon component to form a solution and the brine component is thereafter emulsified therein with sufficient shear energy to provide an emulsion having a brine particle size of less than 10, preferably less than 1, micrometer in diameter, any remaining liquid hydrocarbon being mixed with said emulsion.

Specifically, from 0.5 to 15 parts by weight of the polydiorganosiloxane is first dissolved in aV parts by volume of the liquid hydrocarbon where a denotes a number having a value of from greater than zero to 1 and V has a value of from 25 to 99 parts by volume. When a has a value of 1, V' parts by volume of the brine are emulsified in the solution of polydiorganosiloxane in liquid hydrocarbon, where V' has a value of from 1 to 75 parts by volume and the total weight of V+V' has a value of 100 parts by weight, to provide the emulsion compositions of this invention.

In a preferred embodiment of this invention a has a value of less than 1, such as from 0.0001 to 0.1, to provide a concentrated solution of the polydiorganosiloxane which is shipped and/or stored and is subsequently used to form the compositions of this invention. In this case the concentrate is subsequently diluted with bV parts by volume of the liquid hydrocarbon where b denotes a number of from zero to less than one, preferably (1-a). When b has a value of (1-a), V' parts by volume of the brine are emulsified in the diluted concentrated solution of polydiorganosiloxane in liquid hydrocarbon, where V' has a value of from 1 to 75 parts by volume and the total of V+V' has a value of 100 parts by weight, to provide the emulsion compositions of this invention.

In a variation of the preferred embodiment of this invention b has a value of less than (1-a), preferably greater than zero. In this case V' parts by volume of the brine are emulsified in the solution of polydiorganosiloxane in liquid hydrocarbon and cV parts by volume of the liquid hydrocarbon are added to the resulting emulsion, where c has a value of (1-a-b), V' has a value of from 1 to 75 parts by volume and the weight of V+V' has a value of 100 parts by weight, to provide the emulsion composition of this invention.

In the method of this invention the liquid hydrocarbon that is used in each step of emulsion formation may be the same or different. It is preferred that the polydiorganosiloxane component be dissolved in from 0.0001 V to 0.1 V parts by volume of a paraffin hydrocarbon having a flash point of at least 100° F., and the remaining portion of liquid hydrocarbon that is used to form the emulsion be diesel fuel and/or crude oil.

The method and compositions of this invention further comprises the use of an organic, non-ionic surfactant in sufficient amount to reduce the interfacial tension between the brine component and the solution of polydiorganosiloxane in liquid hydrocarbon component without destabilizing the emulsion. Advantageously, the use of an organic, non-ionic surfactant allows the emulsion composition of this invention to be prepared under greatly reduced shear energy so that they can be prepared with simple paddle mixing instead of turbine mixing, homogenizer mixing or colloid mixing. This aspect of the invention finds great utility when the compositions of this invention are prepared in-the-field. In the method of this invention any organic, non-ionic surfactant may be incorporated at any time up to and during the emulsifying process. Preferably any organic, non-ionic surfactant is mixed with the solution of polydiorganosiloxane in liquid hydrocarbon before the brine component is emulsified therein. Conveniently any organic, non-ionic surfactant can be mixed with the concentrate of polydiorganosiloxane in liquid hydrocarbon in the preferred method of this invention.

The preferred organic, non-ionic surfactant to be used in the method and compositions of this invention will depend upon the composition of the brine component. For example, a nonylphenoxypolyethoxyethanol having approximately three oxyethylene units per molecule has been found to be an effective surfactant for reducing needed shear energy when used with light brines, such as a 30 percent by weight solution of $CaCl_2$ in water. For heavier brines, comprising $CaBr_2$ and/or $ZnBr_2$ a long-chain alkanol, such as hexanol, octanol or decanol has been found to be an effective surfactant. Preferably the organic, non-ionic surfactant has a hydrophile-lipophile balance (H.L.B.) value of from 2 to 10.

The amount of organic, non-ionic surfactant to be used in the method of this invention is generally equal to from 0.5 to 1.5 times the amount of polydiorganosiloxane component that is used in any particular composition.

An effective amount and type of organic, non-ionic surfactant to be used for any specific combination of brine and liquid hydrocarbon can be simply determined, in view of the following examples and well-known co-surfactant technology, by performing a few routine experiments. A suitable procedure comprises incorporating a few cosurfactant candidate materials at a few concentrations in a series of compositions of this invention, agitating the mixture with paddle mixing to thoroughly disperse the brine in the liquid hydrocarbon and allowing the resulting mixture to stand at room temperature for 24 hours. A composition of this invention having an effective amount and type of organic nonionic surfactant will not separate during the 24 hour observation period.

The compositions of this invention can comprise any of the additives which are generally dissolved or suspended in invert emulsions of the art to modify emulsion properties such as viscosity, filtration, gelling, density and lubricity. Examples of said additives include weighting agents, such as barium sulfate, oyster shells, galena, iron oxide, or powdered limestone; filtration control agents, such as colloidal clays and oxidized asphalts; and viscosity control agents, such as alkaline-neutralized fatty acids, rosin acids and tall oil and polymer fluids, such as xanthan gums, hydroxycellulose and polyacrylamide.

The following examples are disclosed to further teach how to make and use the present invention.

EXAMPLE 1

Six parts by weight of a trimethylsiloxy-endstopped polydiorganosiloxane consisting of about 64 $(CH_3)(C_8H_{17})SiO_{2/2}$ siloxane units and about 1 $(CH_3)(HO(CH_2CH_2O)_{24}(CH_2CHC-H_3O)_{24}CH_2CH_2CH_2)SiO_{2/2}$ siloxane unit per molecule was dissolved in 34 parts by weight (41.5 parts by volume) of diesel fuel. The resulting solution was agitated in a Hamilton Beach ® malt mixer and a brine consisting of 15 parts by weight (8.3 parts by volume) of an aqueous solution of $CaBr_2$ and 45 parts by weight (19.6 parts by volume) of an aqueous solution of $CaBr_2$ and $ZnBr_2$ was slowly added thereto. The mixture was stirred until the brine particles had a diameter of less than 1 micrometer. A brine-in-liquid hydrocarbon emulsion was obtained which had a viscosity of 200 centipoise at 25° C. and which did not separate when exposed to a temperature of 350° F. for 16 hours in a pressurized, stainless steel Baroid ® high temperature aging cell.

EXAMPLE 2

Three parts by weight of a trimethylsiloxy—endstopped polydiorganosiloxane consisting of about 100 $(CH_3)_2SiO_{2/2}$ siloxane units, about 45 $(CH_3)(C_{12}H_{25})SiO_{2/2}$ siloxane units and about 2.5 $(CH_3)(HO(CH_2CH_2O)_{24}(CH_2CHCH_3O)_{24}CH_2CH_2CH_2)SiO_{2/2}$ siloxane units per molecule was dissolved in 34.5 parts by weight (45 parts by volume) of Stoddard solvent. The resulting solution was agitated in an Eppenbach turbine stirrer and 118.1 parts by weight (50 parts by volume) of an aqueous solution of $CaBr_2$ and $ZnBr_2$ was slowly added thereto. The resulting brine-in-liquid hydrocarbon emulsion had a brine particle size of from 5 to 7 micrometers and, after standing at room temperature for 2 weeks, experienced about 15 percent by volume settling.

EXAMPLE 3

Example 2 was repeated with the exception that 3 parts by weight of a non-ionic surfactant (nonylphenoxypolyethoxy(4)ethanol) was also dissolved in the liquid hydrocarbon before the brine was emulsified therein. The resulting brine-in-liquid hydrocarbon emulsion was thicker than the emulsion of Example 2, had a particle size of less than 5 micrometers and experiences about 7 to 10 percent settling after 2 weeks at room temperature. When this example was repeated without the polydiorganosiloxane, a stable emulsion was not obtained.

EXAMPLE 4

Four parts by weight of a polydiorganosiloxane having the formula

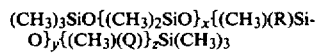

wherein x has a value of about 100, y has a value of about 45, z has a value of about 2.5, R denotes the dodecyl radical and Q denotes the

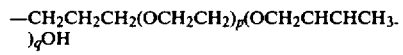

radical wherein p and q each have a value of about 24 was mixed with 1 part by weight (1.7 parts by volume) of an isoparaffin having a flash point of at least 100° F. (Isopar ® M) to form a concentrate solution. This concentrate, and 4 parts by weight of ethoxylated tridecylalcohol (Tergitol ® 15-S-3) were dissolved in 32 parts by weight (39 parts by volume) of fuel oil #2, using a paddle mixer. The paddle mixer was rotated at 400 to 500 r.p.m. and 60 parts by weight (46.2 parts by volume) of a 30 percent by weight solution of $CaCl_2$ in water was slowly added to the stirred solution. After the brine had been completely added the mixture was stirred for 30 minutes and a stable (at least 2 weeks) brine-in-fuel oil emulsion was obtained which had a particle size of less than 1 micrometer. This emulsion could be further diluted with fuel oil #2.

EXAMPLE 5

Example 4 was repeated except that the brine was thickened with hydroxyethylcellulose before it was emulsified in the fuel-oil. An emulsion having a smaller particle size and a greater stability than that of the emulsion of Example 4 was obtained.

EXAMPLE 6

Four parts by weight of the polydiorganosiloxane used in Example 4 was mixed with 1 part by weight (1.3 parts by volume) of Isopar ® M. The resulting concentrated solution, and 3 parts by weight of dodecanol, were mixed with 33 parts by weight (40.2 parts by volume) of diesel fuel using a three-bladed paddle mixer. The mixer was rotated at 400 to 500 r.p.m. and 60 parts by weight (26 parts by volume) of a brine containing $ZnBr_2$ and $CaBr_2$ was slowly added to the stirred solution. A thixotropic emulsion having a brine particle size of less than 0.5 micrometer and a stability of at least seven days at room temperature was obtained. When this low-shear method was repeated in the absence of dodecanol the resulting emulsion separated within 24 hours.

EXAMPLE 7

Example 6 was repeated except an identical amount of decanol, instead of dodecanol, was used. The resulting emulsion was stable, but not quite as stable as the emulsion of Example 6.

EXAMPLE 8

Example 7 was repeated except that an identical weight of Alaska crude oil, instead of diesel fuel, was used. The resulting emulsion of heavy brine-in-liquid hydrocarbon had an average particle size of less than 1 micrometer and was stable to separation for at least 7 days.

EXAMPLE 9

About 4.5 parts by weight of the polydiorganosiloxane described in Example 4 was dissolved in 46.5 parts by weight (56.7 parts by volume) of diesel fuel #2. The resulting solution was placed in an Eppenbach mixer and agitated while 41.8 parts by weight (18.2 parts by volume) of the heavy brine described in Example 6 (sold by the Dow Chemical Company ® as DHW-V) was slowly emulsified therein. The resulting emulsion was thickened by adding 7.2 parts by weight of an amine-treated bentonite clay (Bentone ® 38). The resulting composition of this invention had an average particle size of less than 1 micrometer.

A portion of the thickened emulsion was placed in each of 5 stainless steel aging vessels, the vessels were pressurized with nitrogen and then sealed. One vessel was heated at 300° F. for 5 days, after which the average particle size was no more than 2 micrometers. Another vessel was heated at 400° F. for 7 days with similar results. Another vessel was heated at 500° F. for 5 days with substantially identical results. Another vessel was heated at 600° F. for 3 days with similar results. The remaining vessel was heated at 700° F. for 5 days, after which some degraded material was noted but the average particle size did not exceed 3 micrometers. This example illustrates the thermal stability of a drilling fluid composition of this invention.

EXAMPLE 10

Four parts by weight of the polydiorganosiloxane described in Example 4 was dissolved in 31 parts by weight (37.8 parts by volume) of diesel fuel #2. The resulting solution was placed in an Eppenbach mixer and agitated while 60 parts by weight (26 parts by volume) of the heavy brine described in Example 6 and 5 parts by weight of the bentonite clay described in Example 9 were slowly added, sequentially, thereto. The resulting emulsion had an average brine particle size of no more than 1 micrometer. The thermal stability of the emulsion at 500° F. for 5 days was evaluated as described in Example 9. The average particle size of the heated emulsion did not exceed 2 micrometers, with a few particles being as large as 5 micrometers.

EXAMPLE 11

The polydiorganosiloxane described in Example 4, 1.6 parts by weight, was dissolved in 78 parts by weight (95.1 parts by volume) of diesel fuel #2. The resulting solution was placed in an Eppenbach mixer and stirred while 14 parts by weight (10.8 parts by volume) of a light CaCl$_2$ brine was slowly added thereto. The resulting emulsion was further thickened with 6 parts by weight of an amine-treated bentonite clay (Bentone ® 38). The resulting emulsion had an average brine particle size of from 0.3 to 0.5 micrometer.

We claim:

1. An emulsion composition to be used in well-drilling and comprising
(A) 1 to 75 parts by volume of a brine as a discontinuous phase,
(B) 25 to 99 parts by volume of a liquid hydrocarbon selected from the group consisting of kerosene, diesel oil, crude oil, turbine fuel, mineral oil, gas oil and paraffins having a flash point of at least 100° F. as a continuous phase, and
(C) 0.05 to 15 parts by weight, for every 100 parts by weight of brine plus liquid hydrocarbon, of a polydiorganosiloxane having the formula Z$_3$SiO{(CH$_3$)$_2$SiO}$_x${(CH$_3$)(R)SiO}$_y${(CH$_3$)(Q)SiO}$_z$SiZ$_3$ wherein
Q denotes a polyoxyalkylene radical having the formula —R'(OCH$_2$CH$_2$)$_p$(OCH$_2$CHCH$_3$)$_q$OR", R denotes a monovalent hydrocarbon radical having from 6 to 18 carbon atoms, inclusive,
R' denotes a divalent radical bonded to a silicon atom by a silicon-carbon bond,
R" denotes a monovalent radical selected from the group consisting of hydrogen, alkyl, cycloaliphatic, aryl, arylalkyl and acyl radicals,
Z denotes a monovalent hydrocarbon radical having from 1 to 5 carbon atoms, inclusive, or a Q radical, or an R radical,
x has an average value of from 0 to 400,
y has an average value of from 0 to 400,
z has an average value of from 0 to 5,
x+y+z has an average value of from 30 to 400,
p has an average value equal to or greater than the average value of q and
p+q has an average value sufficient to provide a formula weight of from 600 to 3500 for the —(OCH$_2$CH$_2$)$_p$(OCH$_2$CHCH$_3$)$_q$— portion of the Q radical, there being an average of at least one Q radical and an average of at least one R radical per molecule of the polydiorganosiloxane.

2. An emulsion composition according to claim 1 wherein the polydiorganosiloxane has the formula (CH$_3$)$_3$SiO{(CH$_3$)(R)SiO}$_y${(CH$_3$)(Q)SiO}$_z$Si(CH$_3$)$_3$ wherein y and z are greater than zero and the sum of y+z has an average value of from 30 to 70.

3. An emulsion composition according to claim 2 wherein Q denotes a polyoxyalkylene radical having the formula —CH$_2$CH$_2$CH$_2$(OCH$_2$CH$_2$)$_p$(OCH$_2$CHCH$_3$)$_q$OH, the sum of p+q has an average value of about 50, p has an average value of from about 25 to 50, q has an average value of from about 0 to 25 and R denotes an alkyl radical.

4. An emulsion composition according to claim 1 wherein the polydiorganosiloxane has the formula (CH$_3$)$_3$SiO{(CH$_3$)$_2$SiO}$_x${(CH$_3$)(R)SiO}$_y${(CH$_3$)(Q)SiO}$_z$Si(CH$_3$)$_3$ wherein x has an average value of about 100, y has an average value of from about 30 to 70 and z has an average value of from 1 to 5.

5. An emulsion composition according to claim 4 wherein Q denotes a polyoxyalkylene radical having the formula —CH$_2$CH$_2$CH$_2$(OCH$_2$CH$_2$)$_p$(OCH$_2$CHCH$_3$)$_q$OH, the sum of p+q has an average value of about 50, p has an average value of from about 25 to 50, q has an average value of from about 0 to 25 and R denotes an alkyl radical.

6. An emulsion composition according to claims 1, 2, 3, 4 or 5 further comprising an organic, non-ionic surfactant in sufficient amount to reduce the amount of shear energy needed to prepare the emulsion composition.

7. An emulsion composition according to claims 1, 2, 3, 4 or 5 wherein the brine is an aqueous solution of calcium bromide and zinc bromide and has a density of about 20 pounds per gallon at 20° C.

8. An emulsion composition according to claim 7 wherein the brine is present in an amount of from 40 to 60 parts by volume and the liquid hydrocarbon is present in an amount of from 40 to 60 parts by volume.

9. An emulsion composition according to claims 1, 2, 3, 4 or 5 wherein the brine is present in an amount of from 10 to 60 parts by volume and the liquid hydrocarbon is present in an amount of from 40 to 90 parts by volume.

10. An emulsion composition according to claims 1, 2, 3, 4 or 5 wherein the liquid hydrocarbon comprises at least 90 percent by volume diesel fuel, based on the total volume of liquid hydrocarbon.

11. A method comprising
(I) mixing to form a solution,
(i) 0.5 to 15 parts by weight of a polydiorganosiloxane having the formula Z$_3$SiO{(CH$_3$)$_2$SiO}$_x${(CH$_3$)(R)SiO}$_y${(CH$_3$)(Q)SiO}$_z$SiZ$_3$ wherein
Q denotes a polyoxyalkylene radical having the formula —R'(OCH$_2$CH$_2$)$_p$(OCH$_2$CHCH$_3$)$_q$OR",
R denotes a monovalent hydrocarbon radical having an average of from 6 to 18 carbon atoms, inclusive,
R' denotes a divalent radical bonded to a silicon atom by a silicon-carbon bond,
R" denotes a monovalent radical selected from the group consisting of hydrogen, alkyl, cycloaliphatic, aryl, arylalkyl and acyl radicals,
Z denotes a monovalent hydrocarbon radical having from 1 to 5 carbon atoms, inclusive, or a Q radical, or an R radical,
x has an average value of from 0 to 400,
y has an average value of from 0 to 400, z has an average value of from 0 to 5, x+y+z has an average value of from 30 to 400, p has an average value equal to or greater than the average value of q and p+q has an average value sufficient to provide a formula weight of from 600 to 3500 for the —(OCH$_2$CH$_2$)$_p$(OCH$_2$CHCH$_3$)$_q$— portion of the Q radical, there being an average of at least one Q radical and an average of at least one R radical per molecule of the polydiorganosiloxane, and (ii) aV parts by volume of a liquid hydrocarbon selected from the group consisting of kerosene, diesel oil, crude oil, turbine fuel, mineral oil, gas oil and paraffins having a flash point of at least 100° F., (II) mixing the solution of step (I) with bV parts by volume of the liquid hydrocarbon, (III) mixing V' parts by volume of a brine with the solution of step (II) with sufficient shear energy to provide an emulsion having a brine particle size of less than 10 micrometers in diameter, and (IV) mixing the emulsion of step (III) with cV parts by volume of the liquid hydrocarbon, wherein, V has a value of from 25 to 99 parts by volume, V' has a value of from 1 to 75 parts by volume, V+V' has a weight of 100 parts by weight, a has a value of from greater than zero to 1, b has a value of from zero to less than 1, c has a value of from zero to less than 1, and a+b+c has a value of 1.

12. A method according to claim 11 wherein V has a value of from 10 to 60 parts by volume and V' has a value of from 40 to 90 parts by volume.

13. A method according to claims 11 or 12 wherein a has a value of less than 1.

14. A method according to claim 13 wherein b has a value of (1-a) and c has a value of zero.

15. A method according to claim 13 wherein a has a value of from 0.0001 to 0.1 to provide a concentrated solution of the polydiorganosiloxane.

16. A method according to claim 15 wherein the concentrated solution consists of the polydiorganosiloxane and a paraffin having a flash point of at least 100° F.

17. A method according to claim 16 wherein the balance of the liquid hydrocarbon is diesel fuel.

18. The emulsion produced by the method of claim 15.

19. The emulsion produced by the method of claim 16.

20. The emulsion of claim 19 further comprising an organic, non-ionic surfactant, the weight of said surfactant having a value of from 0.5 to 1.5 times the weight of said polydiorganosiloxane.

* * * * *